US012566616B2

(12) United States Patent
Lutter

(10) Patent No.: US 12,566,616 B2
(45) Date of Patent: Mar. 3, 2026

(54) AUTOMATED CONFIGURATION OF SOFTWARE SYSTEMS USING IMAGES OF COMPUTING DEVICES OR PERIPHERALS

(71) Applicant: Zoom Communications, Inc., San Jose, CA (US)

(72) Inventor: Jan Lutter, Ahlen (DE)

(73) Assignee: Zoom Communications, Inc., San Jose, CA (US)

( * ) Notice: Subject to any disclaimer, the term of this patent is extended or adjusted under 35 U.S.C. 154(b) by 192 days.

(21) Appl. No.: 17/968,108

(22) Filed: Oct. 18, 2022

(65) Prior Publication Data

US 2024/0126562 A1 Apr. 18, 2024

(51) Int. Cl.
*G06F 9/445* (2018.01)
*G06F 8/76* (2018.01)

(52) U.S. Cl.
CPC ............ *G06F 9/44505* (2013.01); *G06F 8/76* (2013.01)

(58) Field of Classification Search
CPC .......... G06F 9/44505; G06F 8/76; G06F 9/44
USPC ........................................ 717/121
See application file for complete search history.

(56) References Cited

U.S. PATENT DOCUMENTS

| | | | | |
|---|---|---|---|---|
| 5,963,939 A | * | 10/1999 | McCann ................ | G06Q 30/06 |
| | | | | 715/705 |
| 12,026,956 B1 | * | 7/2024 | Purdy ....................... | G06T 7/20 |

| | | | | |
|---|---|---|---|---|
| 2008/0320472 A1 | * | 12/2008 | Laska ................ | G06F 11/3664 |
| | | | | 717/178 |
| 2009/0064108 A1 | * | 3/2009 | De Atley ............ | G06F 9/44505 |
| | | | | 717/121 |
| 2010/0313105 A1 | * | 12/2010 | Nekoomaram ....... | H03M 13/09 |
| | | | | 717/171 |
| 2011/0321014 A1 | * | 12/2011 | Nagoria .............. | G06F 11/2289 |
| | | | | 717/124 |
| 2019/0362841 A1 | * | 11/2019 | Aysin ........................ | G06N 3/08 |
| 2021/0117307 A1 | * | 4/2021 | MacNamara ....... | G06F 11/3433 |
| 2021/0218571 A1 | * | 7/2021 | Ansari ................ | H04M 15/705 |
| 2023/0393860 A1 | * | 12/2023 | Walker ................ | G06F 11/3495 |

* cited by examiner

*Primary Examiner* — Bradley A Teets
*Assistant Examiner* — Zengpu Wei
(74) *Attorney, Agent, or Firm* — Young Basile Hanlon & MacFarlane, P.C.

(57) ABSTRACT

Methods, systems, and apparatus, including computer programs encoded on computer storage media for automated configuration of software systems using images of computing devices or peripherals. The system may receive an image depicting one or more computing devices or peripherals. Based on the received images, the system may determine a device model of the one or more computing devices or peripherals. The system may determine the identification and compatibility of the device model of the one or more computing devices or peripherals with at least one software application. The system may provide for display, via a user interface, an indication of the compatibility of the one or more computing devices with the at least one software application. Additionally, the system may automatically configure the software application to use the identified computing devices or peripherals.

20 Claims, 10 Drawing Sheets

600

500

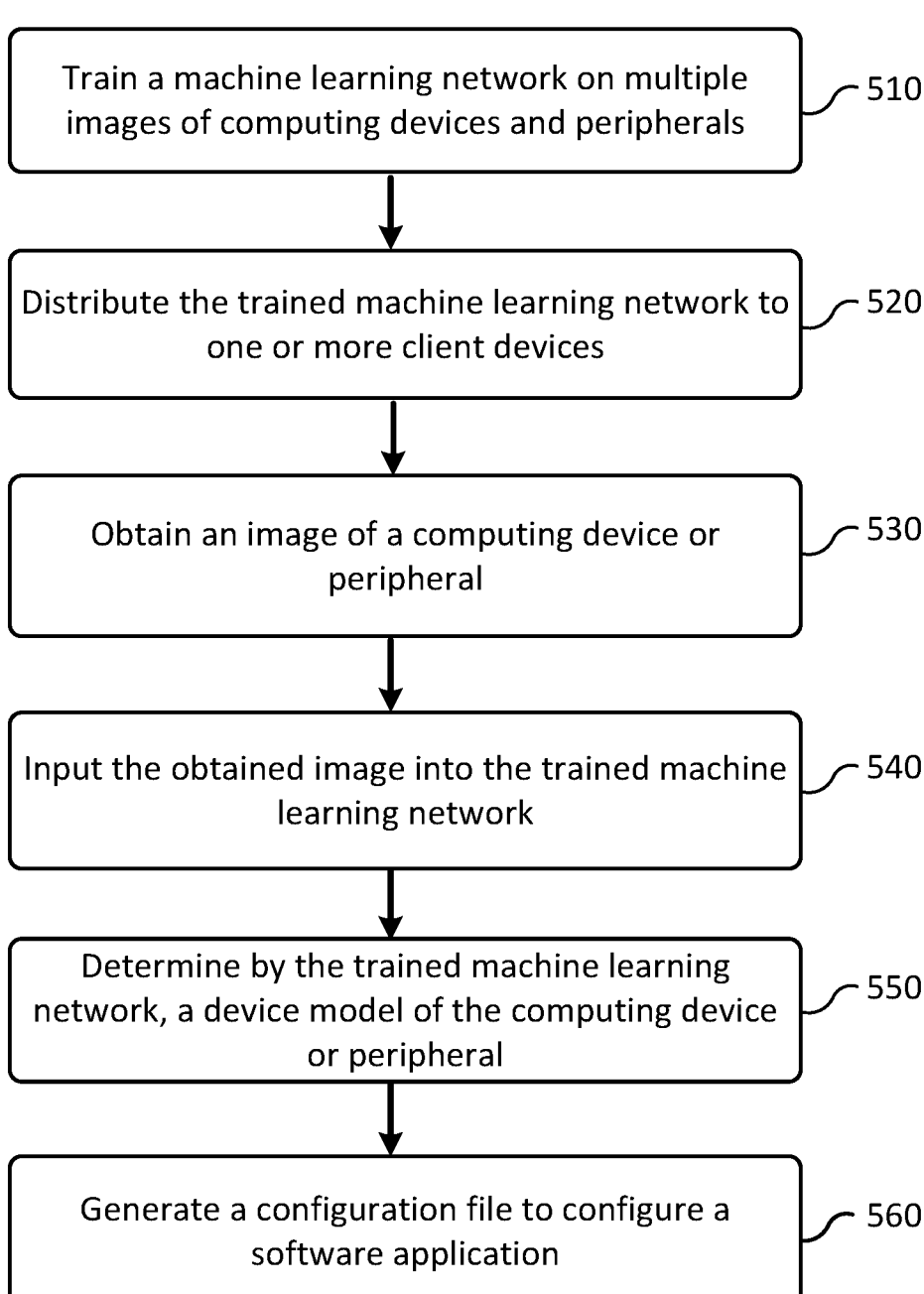

Train a machine learning network on multiple images of computing devices and peripherals — 510

Distribute the trained machine learning network to one or more client devices — 520

Obtain an image of a computing device or peripheral — 530

Input the obtained image into the trained machine learning network — 540

Determine by the trained machine learning network, a device model of the computing device or peripheral — 550

Generate a configuration file to configure a software application — 560

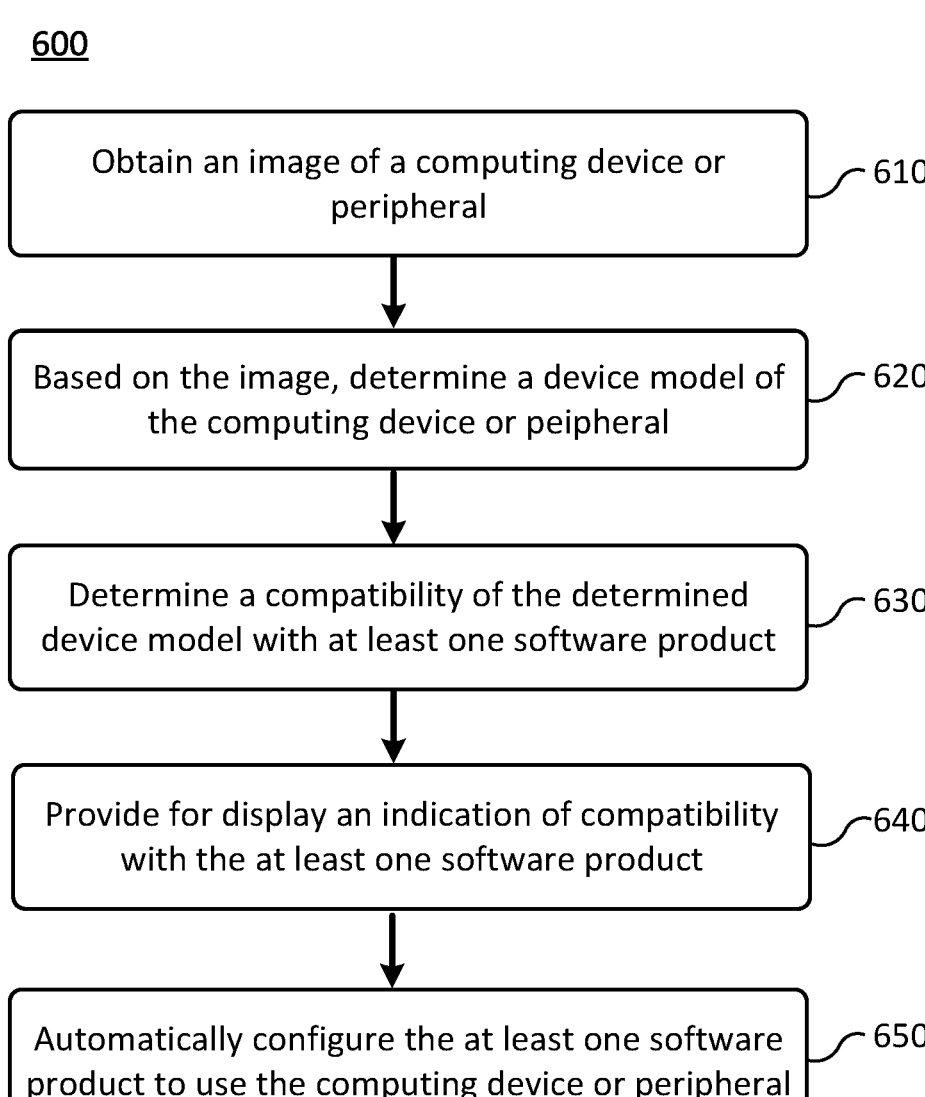

Obtain an image of a computing device or peripheral ⎯ 610

Based on the image, determine a device model of the computing device or peipheral ⎯ 620

Determine a compatibility of the determined device model with at least one software product ⎯ 630

Provide for display an indication of compatibility with the at least one software product ⎯ 640

Automatically configure the at least one software product to use the computing device or peripheral ⎯ 650

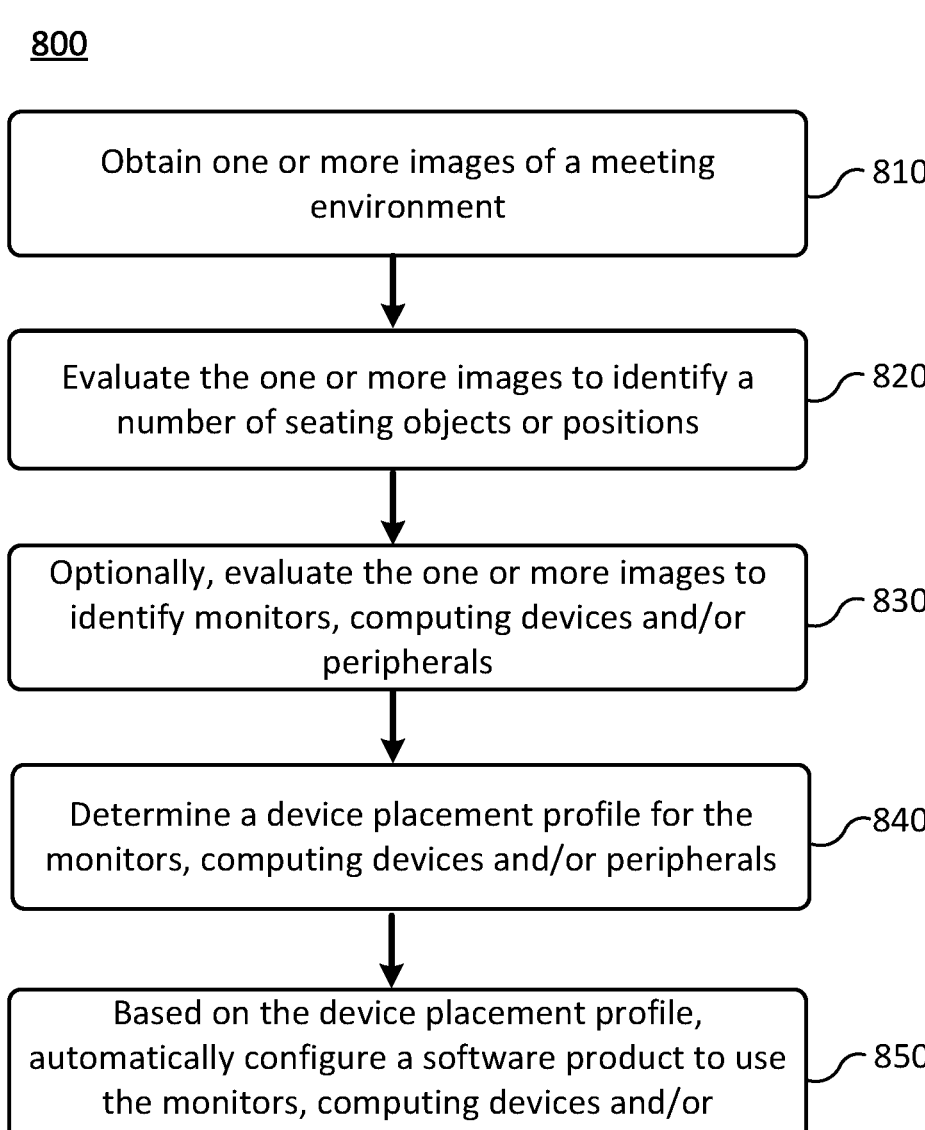

Obtain one or more images of a meeting environment ⌐ 810

Evaluate the one or more images to identify a number of seating objects or positions ⌐ 820

Optionally, evaluate the one or more images to identify monitors, computing devices and/or peripherals ⌐ 830

Determine a device placement profile for the monitors, computing devices and/or peripherals ⌐840

Based on the device placement profile, automatically configure a software product to use the monitors, computing devices and/or peripherals ⌐ 850

FIG. 8

AUTOMATED CONFIGURATION OF SOFTWARE SYSTEMS USING IMAGES OF COMPUTING DEVICES OR PERIPHERALS

CROSS-REFERENCE TO RELATED APPLICATIONS

None.

FIELD

This application relates generally to configuring software system to use hardware components or peripherals, and more particularly, to systems and methods for automated configuration of software systems using images of hardware components or peripherals.

SUMMARY

The appended claims may serve as a summary of this application.

BRIEF DESCRIPTION OF THE DRAWINGS

FIG. 5 is a flow chart illustrating an exemplary method that may be performed in some embodiments.

FIG. 6 is a flow chart illustrating an exemplary method that may be performed in some embodiments.

FIG. 8 is a flow chart illustrating an exemplary method that may be performed in some embodiments.

DETAILED DESCRIPTION OF THE DRAWINGS

Figure 1A:
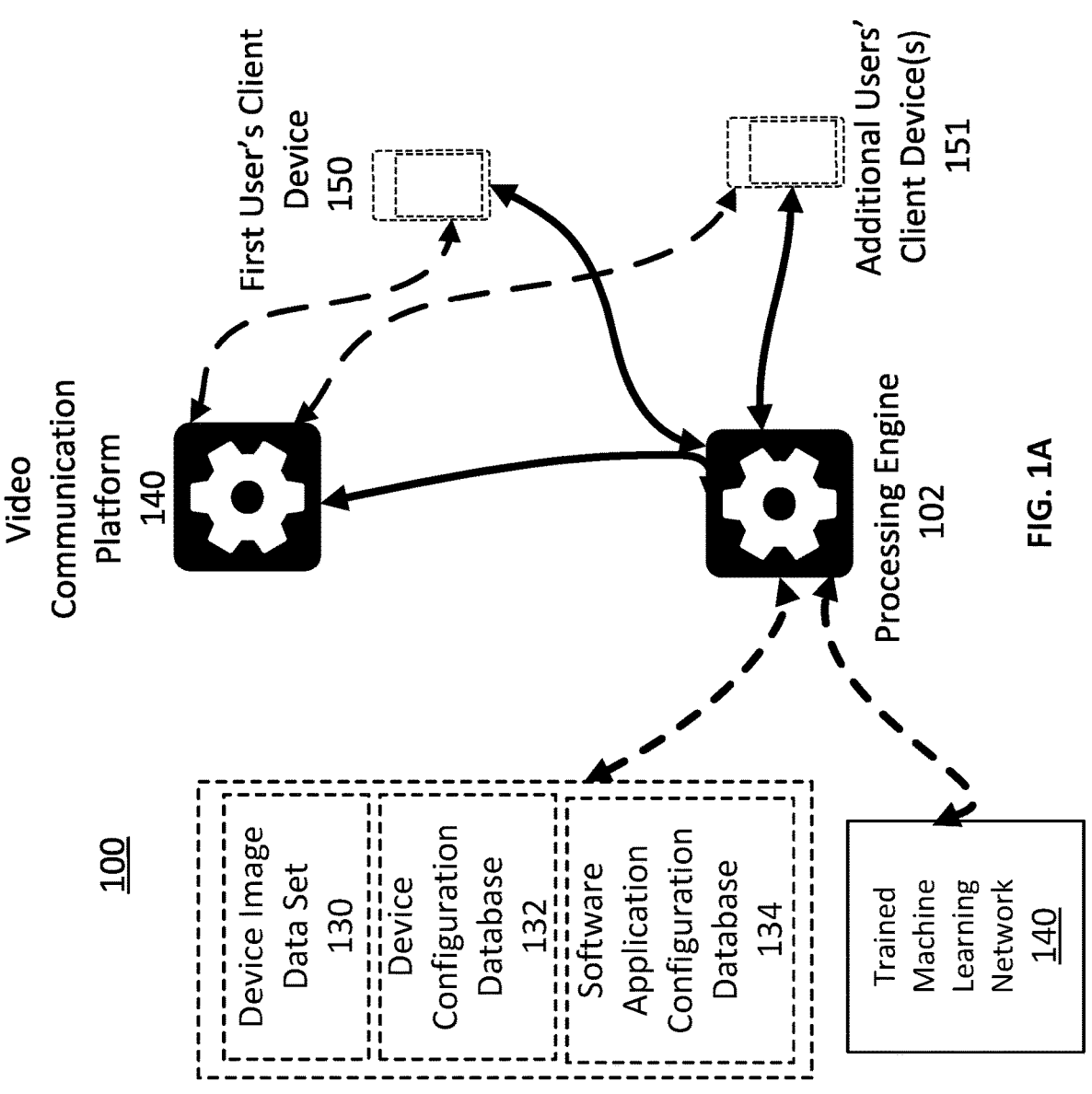
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a device image data set 130 for training a machine learning network, a device configuration database 132, and a software application configuration database 134. One or more of the databases may be combined or split into multiple databases. The first user's client device 150 and additional users' client device(s) 151 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device. While the video communication platform is illustrated as a type of software system that may be configured by the processes described herein, other type of systems, software or applications that may use different computing devices and/or peripherals may also be configured.

In an embodiment, processing engine 102 may perform the methods 500, 600 or other methods herein and, as a result, provide for automated configuration of software systems using images of hardware components or peripherals. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to view video conference participants, video presentations, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platforms 140, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform.

In some embodiments, optional repositories can include one or more of: a device image data set 130, device configuration database 132 and a software application configuration database 134.

Video communication platform 140 comprises a platform configured to facilitate video presentations and/or communication between two or more parties, such as within a video conference or virtual classroom. In some embodiments, video communication platform 140 enables video conference sessions between one or more users. The video communication platform 140 may interact with different client devices that are interconnected with different computing devices and peripherals. For example, a client device may interconnect with different microphones, cameras, keyboards, mice, tablets and other input peripherals. Also, the video communication platform 140 may interact with different computing devices such as mobile phones, desk top computers, lap top computers, tablet devices, etc.

Figure 1B:
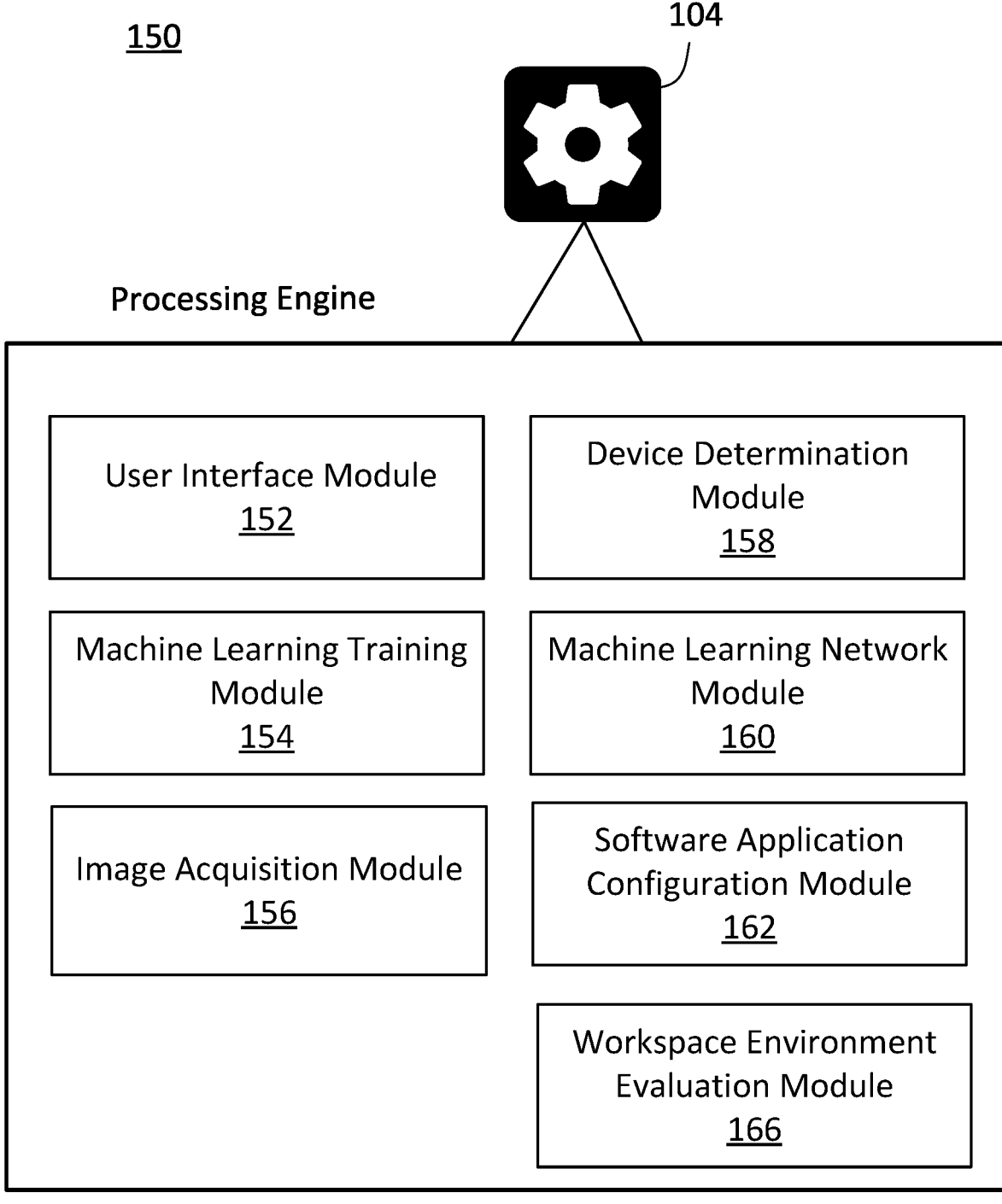
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for automated configuration of software systems using images of hardware components or peripherals.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Machine Learning Training Module 154 provides system functionality for the training of a machine learning network based on an image dataset of different types of computer peripherals and computing devices. The machine learning network may be trained to recognize or classify a particular computing device or peripheral. The training of the machine learning network for example may be based on supervised learning where multiple images of a particular computing devices is identified by model and type. Other information may be associated with the device such as manufacturer, model version, model year, etc. Different image views of the particular device provide better results in the training of the machine learning network. Once the machine learning network is trained, then subsequent images of peripherals or computing devices may be obtained and input into the trained machine learning network. The trained machine learning network 140 may then classify and/or predict a likelihood that the device identified in an image is of a particular model and type.

The Image Acquisition Module 156 provides system functionality for obtaining an image or multiple images and optionally preprocessing the images before the images are input to the trained machine learning network for classification. For example, an image may be obtained by a client device of one or more computing devices and/or one or more peripherals. The Image Acquisition Module 156 may perform object detection on an image and determine pixel boundaries for objects in the image and create sub-images of pixels for the different objects. Each of these sub-images may be input into the machine learning network for classification.

In some embodiments, the Image Acquisition Module 156 may identify an area of the image that may include textual identifying of a computing device or peripheral. For example, an image may include a brand, logo, serial number, or other identifiers describing the computing device or peripherals. This information may be used by the system to increase the likelihood that a computing device or peripheral depicted in an image is of a particular type and/or model of a computing device or peripheral.

The Device Determination Module 158 provides system functionality for interacting with the Machine Learning Network Module to determine the one or more computing device and/or the one or more peripherals depicted in an image. The Device Determination Module 158 determines whether an identified computing device and/or peripheral is compatible with a software application or system.

The Machine Learning Network Module 160 provides system functionality for using a trained machine learning network to process obtained images of computing devices (such as laptops, tablet devices, mobile phones, etc.) and peripheral devices (such as cameras, microphones, etc.) and determine a type and model of computing devices and/or peripherals depicted in the images.

The Software Application Configuration Module 162 interacts with the Device Determination Module 158 to generate a configuration file for a software application or system. The Software Application Configuration Module 162 may perform multiple configuration processes. For example, the Software Application Configuration Module 162 may interact directly with a software application, for example, via an application program interface, and set configuration parameters for the software application to use an identified computing device or peripheral. Also, the Software Application Configuration Module 162 may generate configuration files transmitted to and may be imported or input to the software application for configuring the software application to use the identified computing device or peripheral.

Additionally, the Software Application Configuration Module 162, may perform an optimization process that selects a combination of multiple computing devices and/or peripherals that are compatible to optimally work together for the software application. For example, an image may depict various microphones and various web cameras. After determining the type and model of the various microphones and various web cams, the Software Application Configuration Module 162 may select a type of microphone and a type of web cam that may optimally work with a particular software application. The system may perform a lookup or search of the Software Application Configuration Database 134. The Software Application Configuration Database 134 may have a ranked list of devices that would work with the particular application. For example, with respect to microphones, the database may list may rank higher microphones that provide a higher quality audio input, than other microphones. A microphone identified microphone have a ranked higher quality audio input, may be selected over another microphone that is ranked with a lower quality input The Workspace Environment Evaluation Module 166 interacts with the Device Determination Module 158 to generate a device placement profile for a software application or system. The Workspace Environment Evaluation Module 166 evaluates an image of a workspace environment (such as an office room, an open office space, a conference room or a home office) and generates a device placement profile. The device placement profile describes or identifies particular devices to be used for the workspace environment and the placement location of the devices within the workspace environment. The Workspace Environment Evaluation Module 166 also may interact with the Software Application Configuration Module 162 to select one or more devices to be used within the workspace environment.

Figure 2:
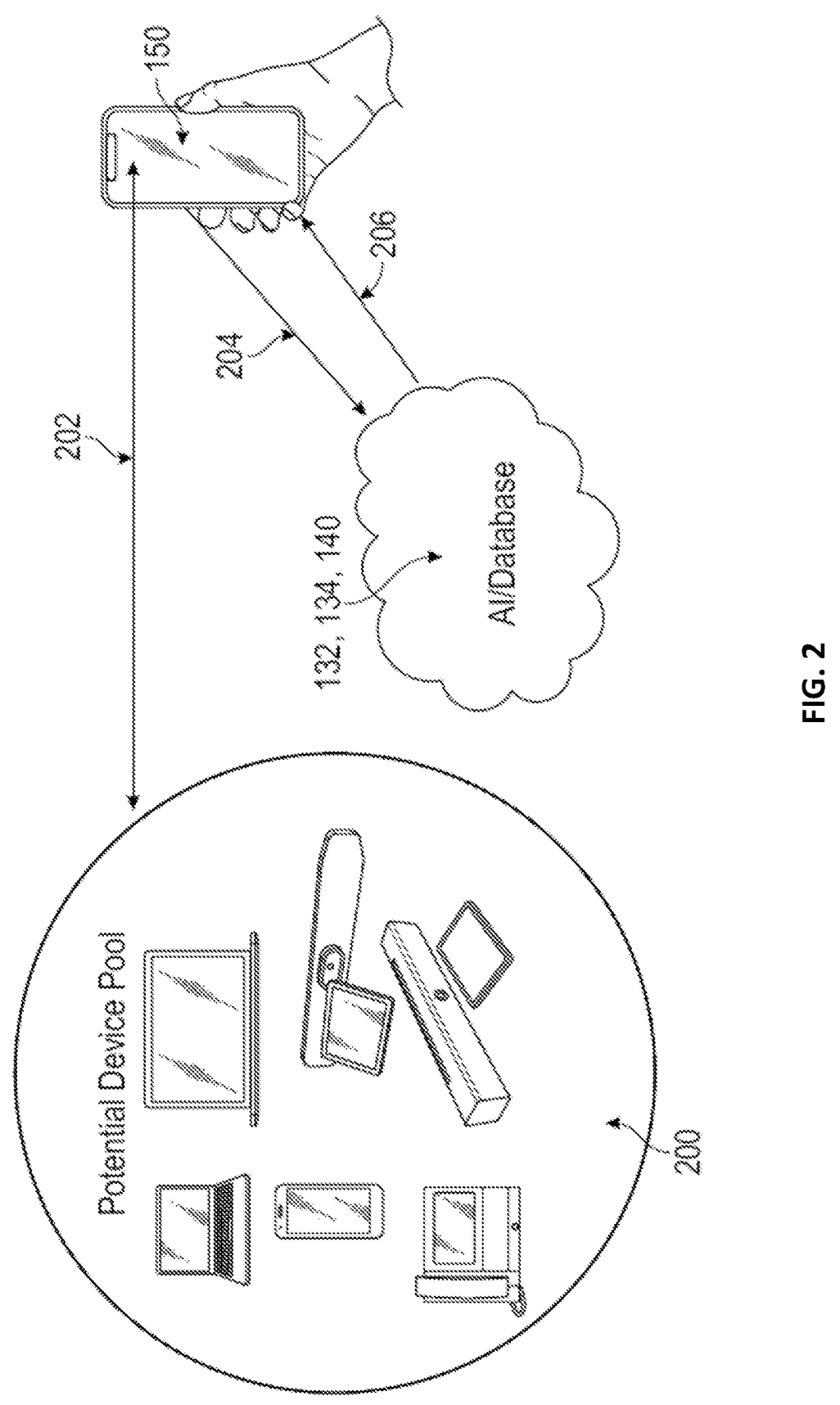
FIG. 2 is a diagram illustrating an exemplary environment in which some embodiments may operate.

FIG. 2 is a diagram illustrating an exemplary environment in which some embodiments may operate. In this example, a client device 150 obtains 202 an image of one or more devices 200 that the user wants to check for compatibility for use with the video conferencing platform. The client device 150 interacts 204 with one or more of the databases 132, 134 and provides the image as input into the trained machine learning network 140. The client device 150 may determine the compatibility of the one or more devices with the video conferencing platform. For example, the computing device 150 may determine that only one of the depicted laptop computing devices is compatible with the video conferencing application. The client device may display via a user interface a picture of the devices that are compatible with the video conferencing platform. Detailed device information may be presented via the user interface showing those devices that are compatible with the video conferencing platform.

Figure 3:
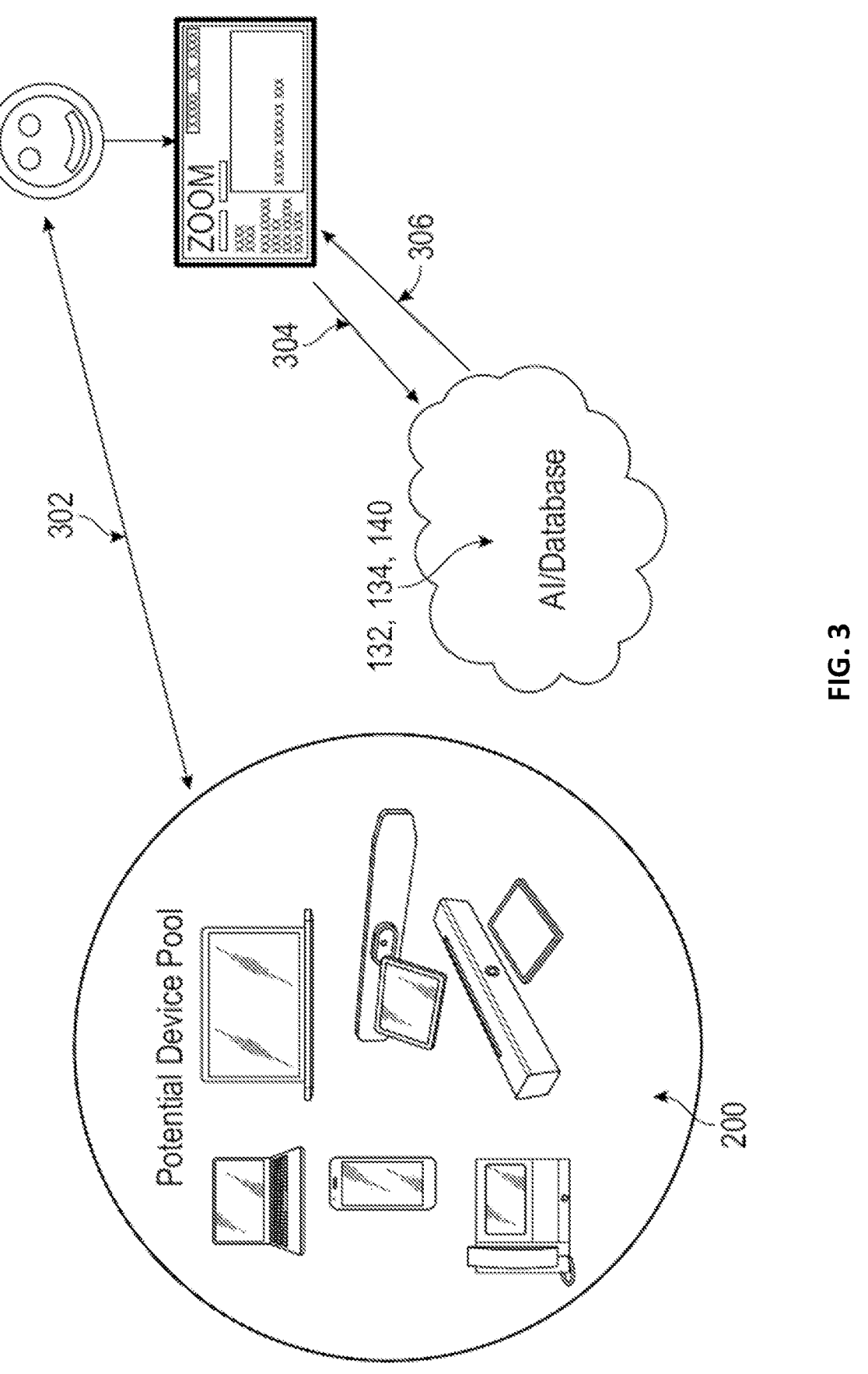
FIG. 3 is a diagram illustrating an exemplary environment in which some embodiments may operate.

FIG. 3 is a diagram illustrating an exemplary environment in which some embodiments may operate. In this example, a user uploads an existing photo of a device that the user want to check for compatibility with a particular software application or software system. The system may include a web-based portal or other client device interface that may receive the image. In the example of the web-based portal (e.g., a service operating on one or more servers), the web-based portal may evaluate the image and determine devices depicted in the image. The web-based portal interacts 304 with one or more of the databases 132, 134 and provides the image as input into the trained machine learning network 140. Information is provided 306 to the web-based portal indicating the model and type of the device. The web-based portal may generate a user interface displaying the device from the image and a graphical indication (via text or a graphic image) of whether the device is compatible with a particular software application or of software system. picture of the devices that are compatible with the video conferencing platform.

Figure 4:
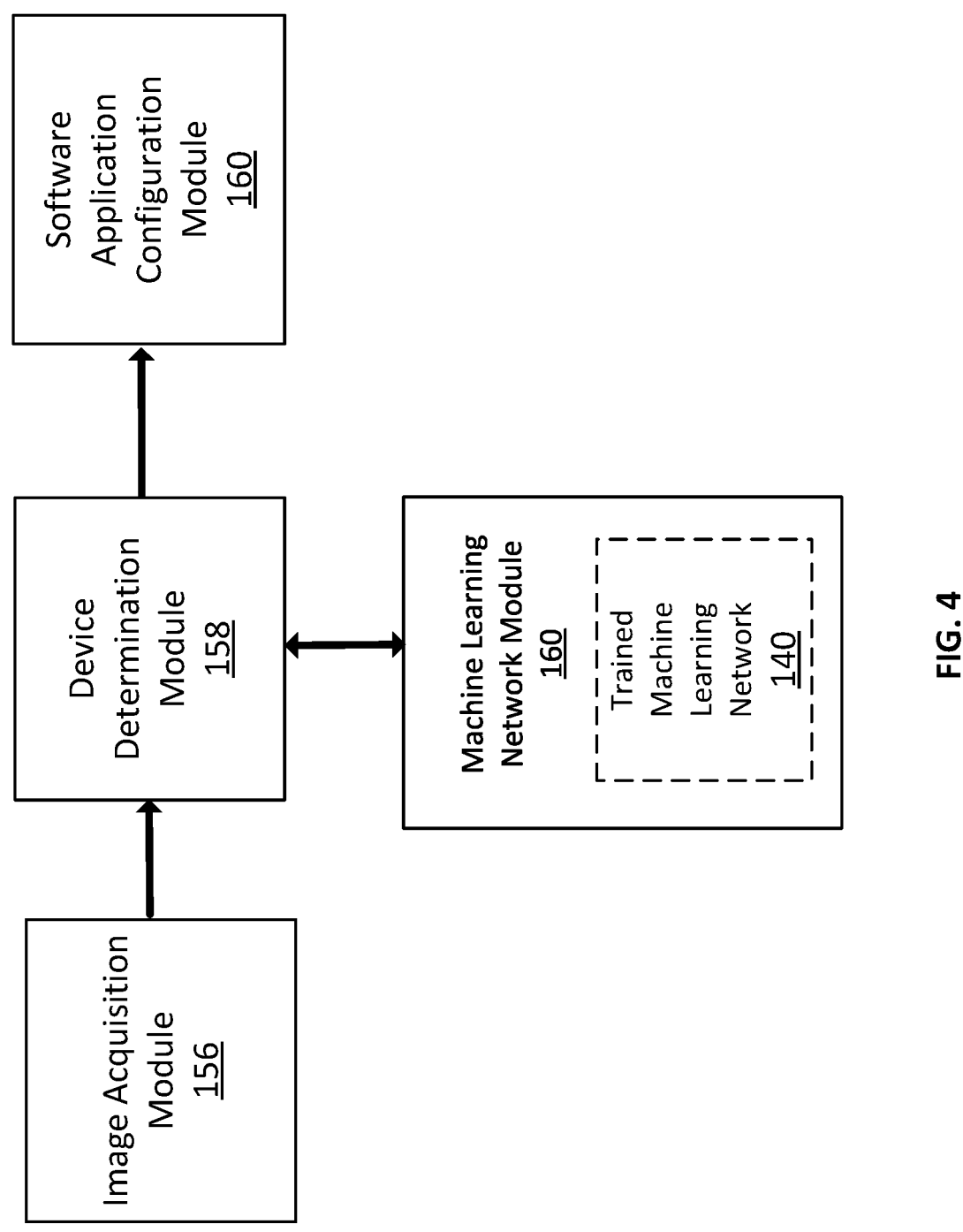
FIG. 4 is a diagram illustrating an exemplary environment in which some embodiments may operate.

FIG. 4 is a diagram illustrating an exemplary environment in which some embodiments may operate. In this example, an image may be obtained of a single device (i.e., a computing device or peripheral) or of multiple devices. The image may be obtained by a client device, such as a mobile phone or tablet device. The Image Acquisition Module 156 may perform optional processing on the image. For example, the Image Acquisition Module 156 may perform a process to determine whether multiple devices are depicted in the image using object detection techniques. The Image Acquisition Module 158 may create sub-images for each of the detected object in the image.

The Image Acquisition Module 158 then provides an image or sub-images to the Device Determination Module 158. The Device Determination Module 158 communicates with the Machine Learning Network Module 160 to determine or classify a model and type of a computing device or a peripheral. The Image Acquisition Module 158 provide an image to the Machine Learning Network Module 160 which is configured to input the image into the Trained Machine Learning Network 140. The Trained Machine Learning Network 140 then evaluates the image and classifies the object in the image as a particular model and type of a computing device or a peripheral. For example, an image of a mobile phone may be input into the Trained Machine Learning Network 140, which in turn, based on its training, provide a classification as the make, model and type of the mobile phone. This information will be returned to the Device Determination Module 158.

The Device Determination Module 158 interacts with the Software Application Configuration Module 160. The information about the computing device or a peripheral may include a unique identifier based on the make and model of the computing device or peripheral. The Device Determination Module 158 may use this identifier to retrieve from one or more Device Configuration Databases 132, other aspect or characteristics about the computing device or peripheral. These additional aspects and characteristics may be provided to the Software Application Configuration Module 160. In some instances, the Device Determination Module 158 may provide multiple identifiers where the multiple devices which were identified in an image.

The Software Application Configuration Module 160 may use one or more Software Application Configuration Database 134 to determine whether the identified device or devices are compatible with a particular software application or software system. For example, the Software Application Configuration Database 134 may include data describing a software application and version of the software application. The database 134 may include a table of devices that are compatible with the software application, where compatibility indicates that a particular device will work with the software application. A search or table lookup may be performed using the identifier of the device to find a compatibility indication for the software application. The Software Application Configuration Module 160 may generate a user interface indicating compatibility of the identified device where the compatibility indication is indicated as true or yes. If a compatibility record is not found or is indicated as false or no for the identified device, then the Software Application Configuration Module 160 may generate a user interface indicating that the identified device is not compatible with the software application.

In some embodiments, the Software Application Configuration Module 160 may perform an automatic configuration based on identified device. For example, after obtaining the identification of a device (such as an identifier and/or a make and model of a device), the system may automatically create a configuration file or instructions to configure a software application. For example, assume that a particular web camera was identified. The Software Application Configuration Database 134 may include configuration parameters for various web camera. The system may access this database and obtain the configuration parameters. The system may generate a configuration file that may be provide to the software application, which in response will configure the software application to use the particular web camera. For instance, the web camera may have a resolution of only 720p. The system may generate a configuration file to set the software application to use only a resolution of 720p.

In some embodiments, a user may obtain imagery of multiple computing devices and peripherals. The Software Application Configuration Module 160 may select which devices may optimally be suited for use with a software application. For example, an image may include three web cameras. The system then identifies the three different makes and models of the web cameras. For example, web camera one is a particular make and model that has a resolution of 720p, web camera two is a particular make and model that has a resolution of 1080p, and web camera two is a particular make and model that also has a resolution of 1080 but with a built-in-microphone. The Software Application Configuration Module 160 may determine that each of the web cameras are compatible with the software application. However, the Software Application Configuration Module 160 may select web camera three as an optimal choice of the three web cameras to use because of the higher resolution and because of the microphone functionality.

FIG. 5 is a flow chart illustrating an exemplary method 500 that may be performed in some embodiments. The system may train a machine learning model and/or machine learning network. In step 510, a machine learning network or model may be trained using a dataset of multiple images of computing devices and peripherals. In some embodiments, the machine learning network may be a neural network, convolutional neural network, deep neural network or other suitable types of machine learning networks. In some embodiments, training samples of images comprise input and output pairs for supervised learning, wherein the input may comprise one or more images of different types of computing devices and peripheral and output pairs including a specific device type, make, model of the computing device or peripheral depicted in an image.

In step 520, the trained machine learning network 140 may be distributed to one or more client devices, where the client devices may use the trained machine learning network to input an image depicting computing devices or peripherals. In some embodiments, the trained machine learning network is stored on a server and the one or more client device may access the trained machine learning network from the server.

In step 530, an image or images of a computing devices or peripherals is obtained by a client device. For example, a user may take a picture of a tablet device with their mobile phone to determine whether the tablet device is compatible with one or more software applications.

In step 540, the obtained image of the computing devices or peripherals is input in the trained machine learning network. The system may perform processing on the image such as object detection to identify different possible computing devices or peripherals in the obtained image. The system may extract pixel groups of the identified objects and separately input the pixel groups into the trained machine learning network 140.

In step 550, the trained machine learning network 140 may determine or classify each of the computing devices or peripherals depicted in an input image, or the separate pixel groups. The trained machine learning network may provide a confidence level that a computing device or peripheral is of a certain make and model.

In step 560, the system may use the determined make and model of the computing device or peripheral to access a software application configuration database 162, and generate a configuration file to configure a software application. The software application configuration database may include parameters and setting for different software applications. For example, the database may be search by the determined make and model of the computing device or peripheral. The database may have separate data records for multiple software applications that are deemed compatible with the determined device model.

In some embodiments, a user interface may display the particular make and model of the determined computing device or peripheral and the user interface may list the different software applications that are compatible with the determined computing device or peripheral. This functionality provides an easy mechanism for a user or administrator configurating a suite of software applications to easily identify whether the computing device or peripheral may be used with the software applications.

FIG. 6 is a flow chart illustrating an exemplary method 600 that may be performed in some embodiments. The system may also automatically configure one or more software applications.

In step 610, an image or images of a computing devices or peripherals is obtained by a client device. For example, a user may take a picture of a tablet device with their mobile phone to determine whether the tablet device is compatible with one or more software applications.

In step 620, the system may determine a device make and model for a computing device or peripheral depicted in the image. For example, the system may determine the make and mode of the tablet device. In some embodiments, steps 610 and 620 are optional. Rather determining the make and model of a computing device or peripheral from an obtained image, the system may receive via a user input textual information identifying the make and model of the computing device or peripheral.

In step 630, the system may use the make and model of the computing device or peripheral to access a software application configuration database 162. The software application configuration database may include parameters and settings for different software applications. For example, the database may be searched by the determined make and model of the computing device or peripheral. The database 162 may have separate data records for multiple software applications that are deemed compatible with the determined device model.

In step 640, a user interface may display the particular make and model of the determined computing device or peripheral and the user interface may list the different software applications that are compatible with the determined computing device or peripheral. This functionality provides an easy mechanism for a user or administrator configurating a suite of software applications to easily identify whether the computing device or peripheral may be used with the software applications.

In step 650, the system may automatically configure one or more compatible software applications to use the determined computing device or peripheral. The system may transmit parameters or configuration settings to a software application. In some embodiments, the transmission of the parameters or configuration settings may be performed via the software's application programming interfaces. Also, a configuration file may be generated with the parameters or configuration settings. The parameters or configuration settings may include data with device identifiers of the determined computing devices or peripherals and associated parameters or configuration settings such that the software application may be use the determined computing devices or peripherals.

Figure 7:
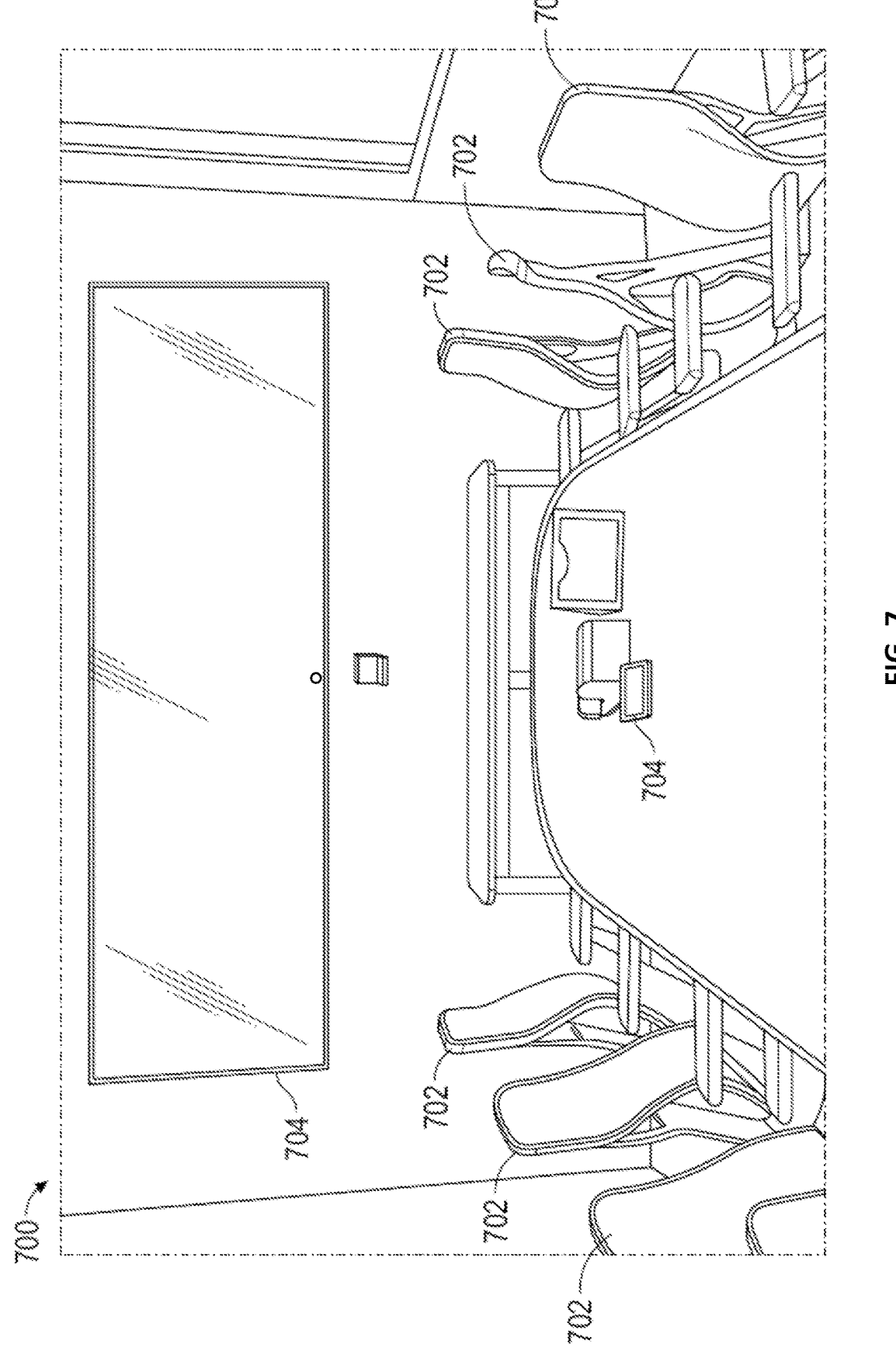
FIG. 7 is an example of a workspace environment they may be evaluated by the system as described herein.

FIG. 7 is an example of a workspace environment 700 that may be evaluated by the system. Using the Workspace Environment Evaluation Module 166, the system may evaluate one or more images of a workspace environment to determine a placement profile for recommended devices or devices identified in image of the workspace environment. A workspace environment may be an office room, an open office space, a conference room, a home office or other location where a video conference would be periodically held.

FIG. 8 is a flow chart illustrating an exemplary method 800 that may be performed in some embodiments. In step 810, the system obtains or receives one or more images of a workspace environment. For example, the system may receive an image of a user's home office with the image depicting their desk and monitor placement. In another example, the system may receive an image of a conference room with a number of chairs placed around a table in the conference room.

In step 820, the system evaluates the one or more images to identify a number of seating objects or positions about a table or a desk in the workspace environment. The system is configured to identify types of objects in the images. For example, the system may identity object types that are of a seating object type. In some embodiments, the machine learning network 140 may be trained on various images of different types of chairs. The one or more images may be input into the machine learning network, which then identifies objects of the seating object type. The position and distance of the seating objects as to one another may be identified. From the location and number of seating object types, the system may then generate a seating object map. The seating object map may identify a location of a seating object and a distance of a seating object to another seating object. In some embodiments, the system may generate a three-dimensional mesh or point-cloud from the one or more images. Also, the system may receive three-dimensional point cloud data of the workspace environment.

In some embodiments, the image is presented via a user interface with functionality to receive an input or selection of the seating objects, a table or other objects, such as a desk or walls. For example, a user may provide an input information identifying the location of each of the seating objects via an input identifying or marking the locations of the seating objects.

In step 830, the system may optionally evaluate the one or more images to identify monitors, computing devices and/or peripherals. This step may be performed according to the device or identification processing as describe herein, such as exemplary methods 500, 600. For example, the image of a user's home office may include a depiction of a laptop, monitors, microphones and other devices on the desk. In another example, the image of the conference room may include monitors or televisions on a wall, microphones and speakers on the table in the conference room.

In step 840, the system may determine a placement profile for device. The device placement profile describes or identifies particular devices to be used for the workspace environment and the placement location of the devices within the workspace environment. The particular devices identified in the placement profile may be determined from one or more of the following processes: (1) manual identification of devices to be used in the workspace environment, (2) automatic identification of the devices obtain from one or more images, and/or (3) recommended devices based on analysis of the workspace environment.

In some embodiments, devices may be manually identified. For example, the system may present a user interface where a user may select from a listing of compatible devices, or input a device identifier, or make and model of a device. The system may then use the selected devices to determine a placement profile for the selected devices.

In some embodiments, the system may automatically determine device that are present in an image. As discussed above, the system may use a trained machine learning network to input an input into the network, and the network identify the particular computing devices or peripherals in the image. The system may then select the compatible devices for an identified software product, and the computing devices or peripherals that are compatible with the software product. The system may then use the identified compatible devices to determine a placement profile for the selected devices.

In some embodiments, the system may determine and recommend suitable devices based on an analysis of the workspace environment. For example, the system may analyze an image of a workspace environment. The system may determine a number of seating objects (such as chairs) by inputting one or more images into the trained machine learning network. The system may determine a distance of the seating objects from one another and determine a total count of the seating objects. Based on the determined distance and the number of seating objects, the system may recommend computing devices that would be suitable for the particular workspace environment. For example, the system may receive an image of a workspace environment that is of a conference room. The image may depict a table and 10 chairs positioned about the table. The system may determine that 10 seating objects exist in the image. The system may also determine the positions of the seating objects and estimate a distance of each of the seating objects from one another. The system may further label seating objects a seating object 1, seating object 2, seating object 3, seating object 4, seating object 5, etc. The system may determine a center or centroid of each seating object and based on a calculated pixel distance of the center or centroid of one seating object to another seating object, the system may determine a distance of the seating objects to each other. The pixels in the image may be associated with a scale such that each pixel represents a particular distance (such as 2 inches, or other distance value). The system may determine that the centroid of seating object 1 is a distance from seating object 2 (such as 2 feet). The system may determine that the centroid of seating object 1 is a distance from seating object 3 (such as 2.5 feet), and so forth.

Based on the seating objects' position and/or the number of detected seating objects, the system may determine one or more computing devices and locations for the one or more computing device to be placed about the workspace environment. For example, the system may determine that since there are 10 seating objects, then 2 microphones should be placed at a particular location about the table so that meeting participants' spoken sounds would be adequately picked up by the microphones from each position of the 10 seating objects. The system may also determine the placement (i.e., the position/location) of speakers, monitors, input devices (such as keyboards or keypads), and other computing devices about the workspace environment.

In some embodiments, the system may generate a placement profile for the selected devices. The system may generate and display a placement profile and/or generate a placement profile in an electronic report or file format. The placement profile may indicate or identify the locations of each of the seating object and the table object. The placement profile may identify recommended locations for the placement of particular monitors, computing devices, speakers, and/or peripherals within the workspace environment (such as placement of devices on a table, desk, wall, ceiling, or other locations.)

In step 850, based on the placement profile, they system may automatically configure a software product to use the monitors, computing devices and/or peripherals identified in the placement profile. The system may then use the placement profile to automatically configure the software product. The Software Application Configuration Module 162 may determine configuration settings and parameters for the selected devices. For example, the Software Application Configuration Database 134 may have a series of predetermined configuration settings and parameters for a particular software product. The Software Application Configuration Module 162 may look up the selected devices and retrieve configuration settings and parameters from the Software Application Configuration Database 134. The system may then automatically configure the particular software product. In some embodiments, the system may use application programming interfaces of the particular software product to set configuration settings and parameters. In other embodiments, the system may generate a configuration file. The configuration file may include the particular devices that are to be used for the software product and include the selected devices and peripherals along with their associated configuration settings and parameters. This configuration file may be imported and/or input into software product. In response, the software product will set configuration settings and parameters to sue the selected devices.

In some embodiments, the Software Application Configuration Module 162 may determine settings of a software application to use the selected devices. For example, based on the room size of the workspace environment settings of the software product may be configured. The system may determine that the workspace environment is of a particular size and/or includes a number of seating objects. Where the workspace environment includes a predetermined number of seating objects, such as 6 chairs, the system may generate configuration parameters or settings for the software product. A feature setting may be set to on or off to activate a function or feature of the software product for larger workspace environments. For example, the system may active Zoom's Smart Gallery functionality where meeting attendees in the workspace environment are individually displayed to other video conference participants during a meeting.

Figure 9:
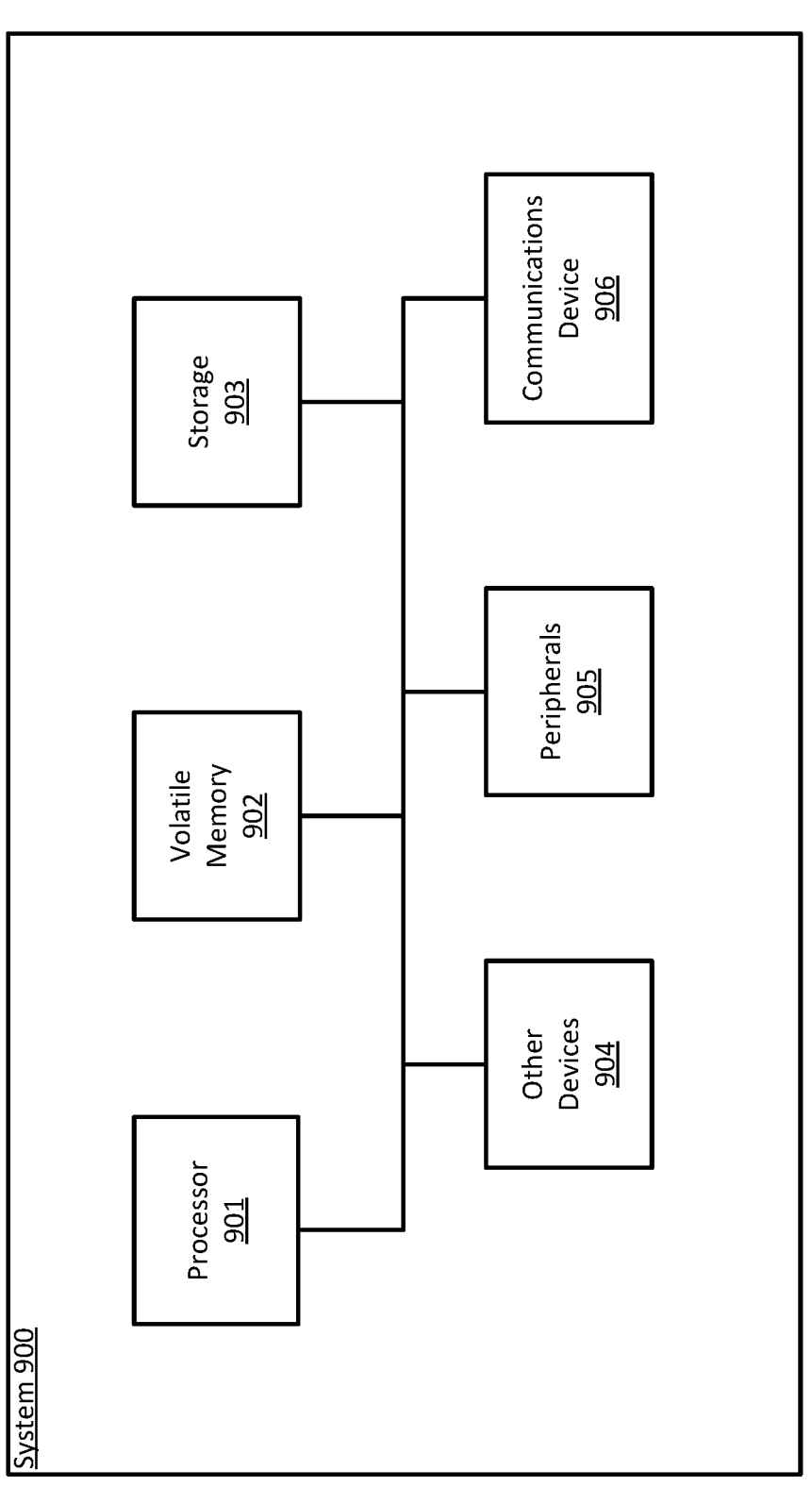
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1: A computer-implemented method comprising: receiving an image, by a client device, the image depicting one or more computing devices; based on the received image, determining a device model of the one or more computing devices; determining the compatibility of the device model of the one or more computing devices with at least one software product; and providing for display, via a user interface of the client device, an indication of compatibility of the one or more computing devices with the at least one software product.

Example 2: The computer-implemented method of Example 1, wherein determining a device model comprises: inputting the received image into a trained machine learning model; and identifying, by the trained machine learning model, the device model of the one or more computing devices.

Example 3: The computer-implemented method of any one of Examples 1-2, wherein determining the compatibility of the device model comprises: comparing the device model, via a comparison table, to find one or more software products compatible with the determined device model, wherein the comparison table includes information for multiple computing device models that have associated compatibility information for one or more software products.

Example 4: The computer-implemented method of any one of Examples 1-3, further comprising: automatically configuring the one or more software products for use with one or more the one or more computing devices.

Example 5: The computer-implemented method of any one of Examples 1-4, further comprising: based on the determined device model, selecting a configuration template for the device model; and applying the configuration template to the one or more software products to configure the one or more software products to use the one or more computing devices.

Example 6: The computer-implemented method of any one of Examples 1-5, further comprising: wherein the received image depicts multiple computing devices; and identifying one of the multiple computing devices as the most suitable for use with a particular software product.

Example 7: The computer-implemented method of any one of Examples 1-6, wherein identifying one of the multiple computing devices as most suitable comprises: ranking the multiple computing devices based on the device model meeting multiple compatibility requirements for using a computing device with the particular software product; and selecting one of the multiple computing devices having a higher rank than other of the multiple computing devices.

Example 8: The computer-implemented method of any one of Examples 1-7, further comprising: evaluating the image to identify a number of seating objects; and determining a device placement profile for one or more of the devices from the group of: monitors, speakers and microphones.

Example 9: The computer-implemented method of any one of Examples 1-8, further comprising: determining a distance of one or more seating objects to other seating objects.

Example 10: A non-transitory computer readable medium that stores executable program instructions that when executed by one or more computing devices configure the one or more computing devices to perform operations comprising: receiving an image, by a client device, the image depicting one or more computing devices; based on the received image, determining a device model of the one or more computing devices; determining the compatibility of the device model of the one or more computing devices with at least one software product; and providing for display, via a user interface of the client device, an indication of compatibility of the one or more computing devices with the at least one software product.

Example 11: The non-transitory computer readable medium of Example 10, wherein determining a device model comprises: inputting the received image into a trained machine learning model; and identifying, by the trained machine learning model, the device model of the one or more computing devices.

Example 12: The non-transitory computer readable medium of any one of Examples 10-11, wherein determining the compatibility of the device model comprises: comparing the device model, via a comparison table, to find one or more software products compatible with the determined device model, wherein the comparison table includes information for multiple computing device models that have associated compatibility information for one or more software products.

Example 13: The non-transitory computer readable medium of any one of Examples 10-12, further comprising: automatically configuring the one or more software products for use with one or more the one or more computing devices.

Example 14: The non-transitory computer readable medium of any one of Examples 10-13, the operations further comprising: based on the determined device model, selecting a configuration template for the device model; and applying the configuration template to the one or more software products to configure the one or more software products to use the one or more computing devices.

Example 15: The non-transitory computer readable medium of any one of Examples 10-14, the operations further comprising: wherein the received image depicts multiple computing devices; and identifying one of the multiple computing devices as the most suitable for use with a particular software product.

Example 16: The non-transitory computer readable medium of any one of Examples 10-15, wherein identifying one of the multiple computing devices as most suitable comprises: ranking the multiple computing devices based on the device model meeting multiple compatibility requirements for using a computing device with the particular software product; and selecting one of the multiple computing devices having a higher rank than other of the multiple computing devices.

Example 17: The non-transitory computer readable medium of any one of Examples 10-16, the operations further comprising: evaluating the image to identify a number of seating objects; and determining a device placement profile for one or more of the devices from the group of: monitors, speakers and microphones.

Example 18: The non-transitory computer readable medium of any one of Examples, the operations further comprising: determining a distance of one or more seating objects to other seating objects.

Example 19: A system comprising one or more processors configured to perform the operations of: receiving an image, by a client device, the image depicting one or more computing devices based on the received image, determining a device model of the one or more computing devices; determining the compatibility of the device model of the one or more computing devices with at least one software product; and providing for display, via a user interface of the client device, an indication of compatibility of the one or more computing devices with the at least one software product.

Example 20: The system of Example 19, wherein determining a device model comprises: inputting the received image into a trained machine learning model; and identifying, by the trained machine learning model, the device model of the one or more computing devices.

Example 21: The system of any one of Examples 19-20, wherein determining the compatibility of the device model comprises: comparing the device model, via a comparison table, to find one or more software products compatible with the determined device model, wherein the comparison table includes information for multiple computing device models that have associated compatibility information for one or more software products.

Example 22: The system of any one of Examples 19-21, further comprising: automatically configuring the one or more software products for use with one or more the one or more computing devices.

Example 23: The system of any one of Examples 19-12, the operations further comprising: based on the determined device model, selecting a configuration template for the device model; and applying the configuration template to the one or more software products to configure the one or more software products to use the one or more computing devices.

Example 24: The system of any one of Examples 19-23, the operations further comprising: wherein the received image depicts multiple computing devices; and identifying one of the multiple computing devices as the most suitable for use with a particular software product.

Example 25: The system of any one of Examples 19-24, wherein identifying one of the multiple computing devices as most suitable comprises: ranking the multiple computing devices based on the device model meeting multiple compatibility requirements for using a computing device with the particular software product; and selecting one of the multiple computing devices having a higher rank than other of the multiple computing devices.

Example 26: The system of any one of Examples 19-25, the operations further comprising: evaluating the image to identify a number of seating objects; and determining a device placement profile for one or more of the devices from the group of: monitors, speakers and microphones.

Example 27: The system of any one of Examples 19-26, the operations further comprising: determining a distance of one or more seating objects to other seating objects.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:

receiving, by a processing engine, an image from a client device;

performing, by the processing engine, object detection on the image to determine pixel boundaries of computing devices;

extracting, by the processing engine, respective pixel groups of each of the computing devices;

classifying each of the respective pixel groups;

determining, by the processing engine, a respective device model of each of the computing devices based on the respective pixel groups with a confidence level;

determining, by the processing engine, an indication of compatibility of the respective device models of the computing devices with at least one software product in a video communication platform;

providing for display, via a user interface of the client device, the indications of compatibility of the computing devices with the at least one software product in the video communication platform;

selecting a subset of computing devices, of the computing devices, that are compatible to optimally work together with the at least one software product, wherein selecting the subset of computing devices comprises ranking the computing devices based on device features including at least a device model and one or more performance characteristics retrieved from a device configuration database; and automatically configuring, by the processing engine, the at least one software product, based on the indication of compatibility, wherein at least one configured software product is configured to use the subset of computing devices, wherein the automatic configuration comprises generating and transmitting configuration parameters to the video communication platform to select and activate the subset of computing devices for use in a video session without user intervention.

2. The computer-implemented method of claim 1, wherein determining the respective device model comprises:

inputting the received image into a trained machine learning model; and identifying, by the trained machine learning model, the respective device models of the computing devices.

3. The computer-implemented method of claim 1, wherein determining the indication of compatibility of the respective device model comprises:

comparing the respective device model, via a comparison table, to find the at least one compatible software product, wherein the comparison table includes information for multiple computing device models that have associated compatibility information for the at least one software product.

4. The computer-implemented method of claim 1, wherein the confidence level indicates a level of confidence that a computing device of the computing devices is of a certain make and model.

5. The computer-implemented method of claim 1, further comprising:

based on the respective device model, selecting a configuration template for the respective device model; and applying the configuration template to the at least one software product to configure the at least one software product to use the computing devices.

6. The computer-implemented method of claim 1, further comprising:

wherein the received image depicts multiple computing devices; and identifying one of the multiple computing devices as most suitable for use with a particular software product.

7. The computer-implemented method of claim 1, wherein identifying one of the computing devices as most suitable comprises:

ranking the computing devices based on the respective device model meeting multiple compatibility requirements for using a computing device with a particular software product; and selecting one of the computing devices having a higher rank than other of the one or more computing devices.

8. A non-transitory computer readable medium that stores executable program instructions that when executed by a processor, cause the processor to perform operations comprising:

receiving an image from a client device;

performing object detection on the image to determine pixel boundaries of computing devices;

extracting respective pixel groups of each of the computing devices;

classifying each of the respective pixel groups;

determining a respective device model of each of the computing devices based on the respective pixel groups with a confidence level;

determining an indication of compatibility of the respective device models of the computing devices with at least one software product in a video communication platform;

providing for display, via a user interface of the client device, the indication of compatibility of the computing devices with the at least one software product in the video communication platform;

selecting a subset of computing devices, of the computing devices, that are compatible to optimally work together with the at least one software product, wherein selecting the subset of computing devices comprises ranking the computing devices based on device features including at least a device model and one or more performance characteristics retrieved from a device configuration database; and automatically configuring the at least one software product, based on the indication of compatibility, wherein at least one configured software product is configured to use the subset of computing devices, wherein the automatic configuration comprises generating and transmitting configuration parameters to the video communication platform to select and activate the subset of computing devices for use in a video session without user intervention.

9. The non-transitory computer readable medium of claim 8, wherein determining the respective device model comprises:

inputting the received image into a trained machine learning model; and identifying, by the trained machine learning model, the respective device models of the computing devices.

10. The non-transitory computer readable medium of claim 8, wherein determining the indication of compatibility of the respective device model comprises:

comparing the respective device model, via a comparison table, to find the at least one compatible software product, wherein the comparison table includes information for multiple computing device models that have associated compatibility information for the at least one software product.

11. The non-transitory computer readable medium of claim 8, wherein the confidence level indicates a level of confidence that a computing device of the computing devices is of a certain make and model.

12. The non-transitory computer readable medium of claim 8, the operations further comprising:

based on the respective device model, selecting a configuration template for the respective device model; and applying the configuration template to the at least one software product to configure the at least one software product to use the computing devices.

13. The non-transitory computer readable medium of claim 8, the operations further comprising:

wherein the received image depicts multiple computing devices; and identifying one of the multiple computing devices as most suitable for use with a particular software product.

14. The non-transitory computer readable medium of claim 8, wherein identifying one of the computing devices as most suitable comprises:

ranking the computing devices based on the respective device model meeting multiple compatibility requirements for using a computing device with a particular software product; and selecting one of the computing devices having a higher rank than other of the one or more computing devices.

15. A system comprising:

a processing engine configured to:

receive an image from a client device;

perform object detection on the image to determine pixel boundaries of computing devices;

extract respective pixel groups of each of the computing devices;

classify each of the respective pixel groups;

determine a respective device model of each of the computing devices based on the respective pixel groups with a confidence level;

determine an indication of compatibility of the respective device models of the computing devices with at least one software product in a video communication platform;

provide for display, via a user interface of the client device, the indication of compatibility of the computing devices with the at least one software product in the video communication platform;

select a subset of computing devices, of the computing devices, that are compatible to optimally work together with the at least one software product, wherein the selection of the subset of computing devices comprises a ranking the computing devices based on device features including at least a device model and one or more performance characteristics retrieved from a device configuration database; and automatically configure the at least one software product, based on the indication of compatibility, wherein at least one configured software product is configured to use the subset of computing devices, wherein the automatic configuration comprises generation and transmission of configuration parameters to the video communication platform to select and activate the subset of computing devices for use in a video session without user intervention.

16. The system of claim 15, wherein the processing engine is configured to:

input the received image into a trained machine learning model; and identify, by the trained machine learning model, the respective device models of the computing devices.

17. The system of claim 15, wherein the processing engine is configured to:

compare the respective device model, via a comparison table, to find the at least one compatible software product, wherein the comparison table includes information for multiple computing device models that have associated compatibility information for the at least one software product.

18. The system of claim 15, wherein the confidence level indicates a level of confidence that a computing device of the computing devices is of a certain make and model.

19. The system of claim 15, wherein the processing engine is configured to:

based on the respective device model, select a configuration template for the respective device model; and apply the configuration template to the at least one software product to configure the at least one software product to use the computing devices.

20. The system of claim 15, wherein the received image depicts multiple computing devices, and the processing engine is further configured to:

identify one of the multiple computing devices as most suitable for use with a particular software product.

*  *  *  *  *